United States Patent [19]

Kawata et al.

[11] Patent Number: 5,434,687
[45] Date of Patent: Jul. 18, 1995

[54] LIQUID CRYSTAL DISPLAY DEVICE HAVING POLARIZATION AREAS OR ORIENTATION AREAS IN RADIAL OR CONCENTRIC RING PATTERN

[75] Inventors: Yasushi Kawata; Kazuyuki Sunohara; Yuko Kizu, all of Yokohama; Masanori Sakamoto, Kawasaki, all of Japan

[73] Assignee: Kabushiki Kaisha Toshiba, Kanagawa, Japan

[21] Appl. No.: 208,879

[22] Filed: Mar. 11, 1994

[30] Foreign Application Priority Data

Mar. 15, 1993 [JP] Japan .................................. 5-054016
Sep. 21, 1993 [JP] Japan .................................. 5-235040

[51] Int. Cl.⁶ .................... G02F 1/1337; G02F 1/1335
[52] U.S. Cl. ........................................ 359/63; 359/78; 359/76; 359/67
[58] Field of Search ................. 359/54, 63, 75, 76, 359/78, 67, 87, 98, 51

[56] References Cited

U.S. PATENT DOCUMENTS

| | | | |
|---|---|---|---|
| 4,114,990 | 9/1978 | Mash et al. | 359/101 |
| 5,020,882 | 6/1991 | Makow | 359/64 |
| 5,069,813 | 12/1991 | Patel | 359/75 |
| 5,097,352 | 3/1992 | Takahashi et al. | 359/63 |
| 5,142,394 | 8/1992 | Asada et al. | 359/75 |

FOREIGN PATENT DOCUMENTS

| | | |
|---|---|---|
| 59-204822 | 11/1984 | Japan . |
| 59-204824 | 11/1984 | Japan . |
| 60-147722 | 8/1985 | Japan . |
| 60-256120 | 12/1985 | Japan . |

*Primary Examiner*—William L. Sikes
*Assistant Examiner*—Tai V. Duong
*Attorney, Agent, or Firm*—Finnegan, Henderson, Farabow, Garrett & Dunner

[57] ABSTRACT

A liquid crystal display device comprises a substrate, two electrode-attached substrates formed by sequentially superposing electrode layers and orientation layers on the substrate and disposed so as to oppose the orientation layers to each other across a gap, and a liquid crystal composition placed in the gap and consequently interposed between the two electrode-attached substrates, which liquid crystal display device is characterized in that the orientation layers is furnished with multiply divided liquid crystal orientation areas and the orientation areas severally have directions of orientation set either in a radial pattern or in the shape of concentric rings.

17 Claims, 8 Drawing Sheets

FIG. 6A
FIG. 6B
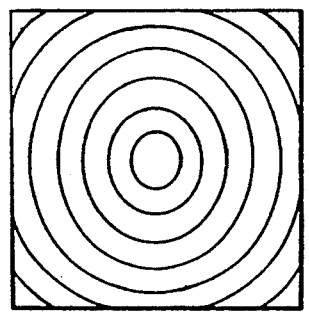
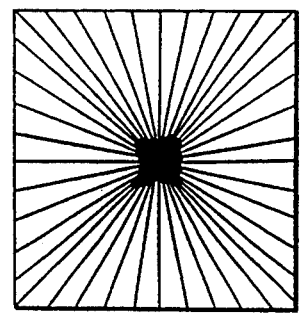
FIG. 7
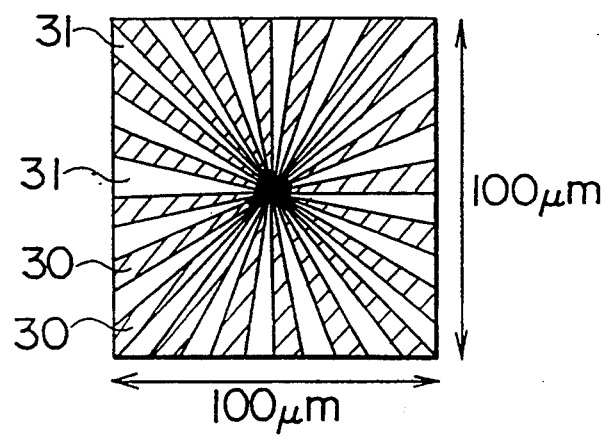
FIG. 8
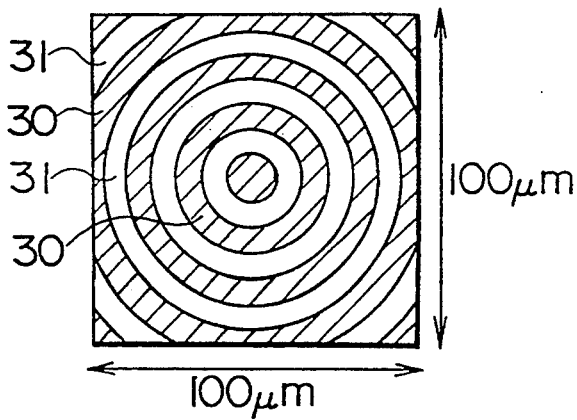

LIQUID CRYSTAL DISPLAY DEVICE HAVING POLARIZATION AREAS OR ORIENTATION AREAS IN RADIAL OR CONCENTRIC RING PATTERN

BACKGROUND OF THE INVENTION

This invention relates to a liquid crystal display device and more particularly to a liquid crystal display device which possesses a highly desirable viewing angle property, a high contrast ratio, and excellent display quality.

In recent years, liquid crystal display devices have been finding extensive utility as display devices in television sets or graphic displays by virtue of such features as thin volume and low electric power consumption. Meanwhile, the necessity of developing liquid crystal display devices which feature high contrast and possess wide viewing angles has been felt acutely.

As respects the manner of display adopted in these liquid crystal display devices, the twist nematic (TN) type which uses a nematic liquid crystal as a liquid crystal composition and the super twisted nematic (STN) type which is an applied version of the TN type have been prevailing to date.

The principle of display according to the TN type will be explained below with reference to FIG. 1A and FIG. 1B is a schematic diagram which is intended to aid in the illustration of the principle of display by the TN type.

The orientation layer in the upper substrate and that in the lower substrate are so treated that the directions of orientation of the liquid crystals in the upper and lower substrates will perpendicularly intersect each other. In this case, as shown in FIG. 1A, the liquid crystals in the display device exhibit an optical rotatory power of 90° because their average directions of major molecular axes are oriented as twisted by 90°.

When this display device is interposed between two mutually parallel polarizing elements, the light is blocked owing to the optical rotatory power of liquid crystals. When voltage is applied to the device, the light is passed through the liquid crystals because the liquid crystals are erected upright except for the areas in the immediate neighborhood of the orientation layers and consequently are deprived of the optical rotatory power as shown in FIG. 1B.

Though the STN type display has the same liquid crystal cell structure as the TN type display, it requires to set the angle of twist of the direction of the average major molecular axis of the liquid crystals in the display device at about 270° C. This display relies for its operation on a change in double refraction and not on a change in optical rotatory power to be brought about by a change in liquid crystal configuration which is induced by application of voltage. This display permits a multiplexed drive on about 200 scanning lines.

The liquid crystal display devices operated by the TN type and the STN type have problems on display characteristics which arise necessarily from their own principles of display. When the screens of the liquid crystal display devices of these two types of display are looked at from an oblique direction, the directions in which the rise of liquid crystal molecules is observed during the application of a voltage are uniquely decided by the viewing angle. Though the screens observed from these directions appear in high contrast, they succumb to color inversion during the display of a halftone image. The screens observed from the directions inverted by 180° from those mentioned above appear in low contrast. To be specific, these types of display both encounter the problem that the viewing angles in which displays in the screens are observed to advantage are limited in a narrow range. Thus, studies are being continued in search of a measure to widen the range imposed on the viewing angles.

In the first place, attempts to equalize the ranges of viewing angle in the methods of TN type and STN type display have been proposed to date. For example, JP-A-59-204,822, JP-A-59-204,824, JP-A-60-147,722, etc. have disclosed a method which obtains the desired increase of the range by giving a concentric rubbing treatment to both the upper and the lower substrate and changing the position of center of rotation between the upper and lower substrates and JP-A-60-256,120 and the like have disclosed a method which accomplishes the increase of the range by giving a concentric rubbing treatment to either of the two substrates and a radial rubbing treatment to the remaining substrate.

These attempts to equalize the ranges of viewing angle in the TN type and STN type display, however, reside invariably in performing a treatment of orientation on the entire surfaces of the substrates. Since the area of disturbed orientation in the neighborhood of the center of orientation (the center of concentric rings or the center of radiation) has a size of the level of an pixel, the pixel within the area of disturbed orientation has the possibility of encountering difficulty in effecting display as expected. Besides, the area of disturbed orientation is at a disadvantage in allowing no improvement in contrast.

A display with a polymer dispersion type liquid crystal has been also proposed. This polymer dispersion type operates on the principle that the display is attained by repressing the scattering of light in the polymer dispersion type liquid crystal display panel thereby controlling the light transmission through the display panel. Unlike the TN type display, therefore, this type avoids such adverse characteristics of viewing angle as low screen contrast inevitably arising from the relation between the direction of orientation of liquid crystal molecules and the direction of observation. It has been demonstrated to be capable of realizing a display property allowing uniform contrast throughout the entire range of viewing angle.

This polymer dispersion type liquid crystal display, however, operates on the principle that a dark state is obtained by scattering the light in transmission. It is, therefore, at a disadvantage in obtaining no sufficient contrast as compared with the TN type display because it is difficult to lower the level of the dark state.

Moreover, the liquid crystal displays discussed above invariably suffer from poor utility of light and, as a result, permit no sufficient decrease in the transmittance in the display of black. In the display of white, they are at a disadvantage in giving only low contrast because the transmittance is not sufficiently improved.

SUMMARY OF THE INVENTION

This invention has for its object the provision of a liquid crystal display device which produces a satisfactory display over a wide range of viewing angle.

This invention further pertains to a liquid crystal device which possesses uniform characteristics of viewing angle dependence as evinced by only sparing dependency of the contrast within the screen on the viewing angle. This invention has for its further object the provision of a liquid crystal display device which possesses an ideal display property ascribable to high utility of light, high luminance, and high contrast.

The invention has for its another object the provision of a liquid crystal device which is capable of easily obtaining multiply divided orientation layers and polarizing layers.

The liquid crystal display device of this invention comprises a substrate, two electrode-attached substrates formed by sequentially superposing electrode layers and orientation layers on the aforementioned substrate and disposed so as to oppose the orientation layers to each other across a gap, and a liquid crystal composition placed in the gap and consequently interposed between the two electro-deattached substrates, providing the orientation layers are furnished with multiply divided liquid crystal orientation areas and the orientation areas severally have directions of orientation disposed either in a radial pattern or in the shape of concentric rings.

The other liquid crystal display device of this invention comprises a substrate, two electrode-attached substrates formed by causing electrode layers and polarizing elements severally containing multiply divided polarization areas to be superposed on the aforementioned substrate and to be disposed so as to oppose the electrode layers to each other across a gap, and a liquid crystal composition placed in the gap and consequently interposed between the two electrode-attached substrates, providing the polarizing elements severally have the directions of axes of easy light transmission or the directions of axes of light absorption disposed either in a radial pattern or in the shape of concentric rings.

Incidentally, the polarizing elements mentioned above may be formed of liquid crystal orientation surfaces of the orientation layers or of the opposite (reverse) surfaces thereof. Alternatively, layers different from the orientation layers may be newly formed and may be utilized as polarizing elements.

The construction of the liquid crystal display device according with the present invention will be outlines below with reference to FIG. 2 and FIG. 3. While FIG. 2 and FIG. 3 depict a transmission type display device, this invention can be similarly embodied in a reflection type display device.

FIG. 2 is a diagram illustrating one example of the whole construction of a liquid crystal display device of the mode of the transmission type three-terminal active matrix display (hereinafter referred to briefly as "TFT-LCD") operated by the TN type display as one embodiment of the present invention.

A plurality of display electrodes 3 are disposed on the surface of a thin-film transistor (TFT) array substrate 1. TFT elements 4 are severally mounted in juxtaposition to the display electrodes 3 and these TFT elements 4 are severally provided with a drain electrode, a source electrode, and a gate electrode (omitted from illustration). On the surface of the TFT array substrate 1, a plurality of data lines 5 and a plurality of address lines 6 are perpendicularly laid mutually. Either the drain electrodes or the source electrodes of the TFT elements 4 are connected to the data lines 5 and the gate electrodes are connected to the address lines 6. In the case of the transmission type liquid crystal display device, the TFT array substrate is provided on the reverse side thereof with a backlight 9 through the medium of a polarizing element 7 and a diffusion plate 8.

A counter substrate 2 is provided on the obverse side thereof with a counter electrode 11 disposed throughout the entire area of the surface through the medium of a color filter layer 10 and it is provided on the reverse side thereof with a polarizing element 12.

The TFT array substrate 1 and the counter substrate 2 are formed of such a light-pervious material as glass or quartz. The display electrode 3 and the counter electrode 11 are made of electroconductive thin film of such a material as ITO (indium tin oxide) or metal. In the case of the transmission type liquid crystal display device, such a light-pervious material as ITO is used for the two electrodes. The use of this light-pervious material only for either of the electrodes is sufficient for the reflection type liquid crystal display device. Generally, the light-pervious material is used more often than not on the counter electrode side. In this case, the liquid crystal display device has no use for the polarizing element 7, the diffusion plate 8, and the backlight 9 which would be otherwise disposed on the reverse side of the TFT array substrate 1.

In the liquid crystal display device illustrated in FIG. 2, the area in which the display electrode 3 and the counter electrode 11 are opposed to each other constitutes one pixel of display. On the surfaces of the two substrates, orientation layers are severally formed through the medium of electrodes, elements, wirings, etc. A spacer is interposed between the TFT array substrate 1 and the counter substrate 2 so as to fix the interval between the two substrates. As the spacer, a multiplicity of spherical or rodlike spacers in popular use may be scattered between the opposed surfaces or a plurality of columnar spacers may be formed at prescribed positions between the opposed surfaces by superposing a polymer layer on the surface of the substrate and removing an unnecessary part from the superposed polymer layer by the photolithographic technique. A liquid crystal composition 13 is sealed in between the orientation layers of the TFT array substrate 1 and the counter substrate 2.

This invention can be applied to a liquid crystal display device of the type which has no drive element particularly mounted on either of a pair of substrates, ie. the type adapted to be operated for the display of the simple matrix type. The construction of the liquid crystal display device of this type will be described below with reference to FIG. 3.

FIG. 3 illustrates one example of the construction of a liquid crystal display device to be used for the display by the simple matrix type. In FIG. 3, a plurality of ribbonlike transparent electrodes 16 (the electrodes of this group 17 will serve as "scanning electrodes") are disposed in the direction of x axis on the surface of a substrate 14 which is formed of such a light-pervious material as glass or quartz. On the surface of a substrate 15 formed of the same light-pervious material as the substrates 14, a plurality of ribbonlike transparent electrodes 18 (the electrodes of this group 19 will serve as "display electrodes") are disposed in the direction of the y axis perpendicularly to the transparent electrodes 16. All of these transparent electrodes may be formed of electroconductive thin film of such a material as ITO, for example. Parts 20 which are formed by the intersection of the electrodes of the group 17 and those of the group 19 constitute pixels for the liquid crystal display device adapted for the display by the simple matrix type. On the surfaces of the two substrates, orientation layers (omitted from illustration) are severally formed through the medium of electrodes. A spacer is interposed between the two substrates to fix the interval therebetween. As the spacer, a multiplicity of spherical or rodlike spacers in popular use may be scattered between the opposed surfaces or a plurality of columnar spacers may be formed at prescribed positions between the opposed surfaces by superposing a polymer layer on the surface of the substrate and removing an unnecessary part from the superposed polymer layer by the photolithographic technique. A liquid crystal composition (omitted from illustration) is sealed in between the orientation layers of the two substrates.

The orientation layers which are used in the two methods of display described above are severally provided with multiply divided liquid crystal orientation areas. The expression "multiply divided" as used herein means division of a relevant layer into at least two parts. Preferably, this division forms orientation areas each containing not more than eight pixels. The characteristics of viewing angle are favorable so long as the number of pixels in one orientation area is within 8. For the sake of obtaining ideal and uniform characteristics of viewing angle, the orientation areas are desired to contain one pixel apiece.

Now, the size of the multiple division will be described specifically below. In the case of a liquid crystal display device which has a display area of 10 to 5 inches, this display area is desired to be multiply divided into areas of a size of from $6 \times 10^{-8} m^2$ to $1 \times 10^{-8} m^2$. In the case of a liquid crystal display device which has a display area of less than 5 inches, the display area is desired to be multiply divided into areas in the range of (display area/total number of pixels) $\times 3$.

In each of the multiply divided liquid crystal orientation areas, the directions of orientation of the orientation layers are disposed either in a radial pattern or in the shape of concentric rings. The centers of the rings or the radiation of the directions of orientation exist in the central parts of the relevant liquid crystal orientation areas. The concentric rings refer to such annular shapes as concentric rings, ellipses, and polygons, for example. The radiation refers to outward emanation from one focal point. The center refers to the central part of the rings, ellipses, etc. mentioned above or the point to which the radiation converges. By specifically fixing the directions of orientation of the orientation layers as described above, the characteristics of viewing angle are uniformized in all directions. Between the two substrates, it is desirable that the orientation layers in either of the substrates should be oriented in the shape of concentric rings and those in the other substrate should be oriented in a radial pattern. It is likewise desirable that the orientation layers in one of the two substrates should be oriented radially in the shape of hyperbolas while those in the other substrate are oriented in the shape of ellipses.

It is desirable that the central parts of the multiply divided liquid crystal orientation areas should be concealed. When the division of orientation produces parts each consisting of several pixels apiece, the necessity of the concealment is obviated by locating the centers of division of orientation in the data and address line parts or black matrix parts which exist between the adjacent pixels.

Further, the treatment of orientation to be given to the central parts of the liquid crystal orientation areas is desired to be carried out rather moderately than exactly. The reason for this particular discrimination in the manner of treatment is as follows. In the central part of each pixel, the orientation carried out in the shape of concentric rings or in a radial pattern is deformed to a great extent when it proceeds uniformly. This deformation of orientation tends to form disclination and give rise to light scattering and impair contrast. Thus, the heavy deformation of orientation can be eliminated and the occurrence of disclination can be precluded by imparting a non-oriented state to the orientation in the central parts of the concentric rings or the radial pattern which form the centers of division of orientation. The non-oriented state can be formed either by the treatment of vertical orientation or by the use of a CRA membrane (chemical reactivity orientation-controlled membrane) or a thermoplastic orientation membrane, for example.

The display in the liquid crystal display device described above is effected by utilizing the loss of optical rotatory power due to the application of voltage. Thus, the polarization elements which are pasted to the outer sides of the two substrates do not need to form the same state of orientation as that in the orientation layers. They may be conventional polarizing elements which form linear polarization. In this case, it is desirable from the viewpoint of repressing discoloration during the application of voltage to set the value of retardation (and) of the liquid crystal display device in the range of 400 nm to 500 nm.

Since the centers of directions of orientation (namely the centers of the concentric rings or the radial patterns formed by the directions of orientation) exist in the central parts of the liquid crystal orientation areas, the positions of the centers of concentric rings or radial patterns of the directions of orientation coincide between the two substrates. Thus, the area of disturbed orientation is fixed on the straight line interconnecting the centers of the two substrates and is perceived as a point when observed from above the screen. This area of disturbed orientation will never be moved by application of an electric field. For the liquid crystal display device of this invention, therefore, it is desirable that a black matrix of the pattern of a dot should be formed so as to cover the area of disturbed orientation. As a result, the part of satisfactory orientration can be exclusively utilized for the display. It is likewise desirable that the columnar spacers which are produced by the photolithographic technique mentioned above should be disposed in the central parts of the orientation areas. This arrangement of the columnar spacers aids in fortifying the linear fixation of the area of disturbed orientation and absorbing the areas of disturbed orientation inherently existing near the spacers.

The treatment of orientation to be given to the substrates can be attained by the conventional rubbing treatment or the microgroove patterning treatment. It is particularly desirable to adopt the microgroove patterning treatment which is capable of infallibly effecting required orientation. The microgroove patterning treatment resides in inscribing fine grooves in the shape of concentric rings or in the radial pattern in the substrate by the photolithographic technique. The pitch with which these fine grooves are formed is desired not to exceed 2 $\mu m$ at most.

The basic construction of the second liquid crystal display device is similar to the construction illustrated in FIG. 2 and FIG. 3 excepting the orientation layers are absent. This liquid crystal display device is characterized by using a polymer dispersion type liquid crystal as a liquid crystal composition and using polarizing elements which have the directions of axes of easy light transmission or the directions of axes of light absorption fixed in the shape of concentric rings or in the radial pattern and have the centers of the directions of axes located in the central parts thereof. Now, the second liquid crystal display device will be described in detail be low with reference to FIG. 4 and FIG. 5. FIG. 4 depicts a cross-sectional construction of the device and FIG. 5 is a diagram portraying an artist's concept of the set state of axes of easy light transmission of a polarizing element.

The liquid crystal display device is composed of transparent substrates 21, 22 each provided with a transparent electrode and a layer having a liquid crystal composition 25 and a polymer resin 26 dispersed in a specific state fit for the formation of a state of light scattering. The polymer dispersion type liquid crystal layer comes in two types; the one type assuming a transparent state in the presence of application of a voltage and an opaque state in the absence of application of a voltage and the other type assuming the states mentioned above under the reverse conditions. These two types are both usable effectively herein.

The directions of axes of easy light transmission or the directions of axes of light absorption in polarizing elements 23, 24 are in the shape of concentric rings 27 or in the radial pattern 28 and the centers of these directions of axes exist in the central parts of the polarizing elements. The terms "concentric rings," "radial pattern," and "centers of directions of axes" as used herein have the same meanings as defined above in the description of the liquid crystal display device as the first aspect of this invention. In FIG. 5, the reference numeral 29 stands for a TFT element.

In FIG. 4 and FIG. 5, the polarizing element 23 and the polarizing element 24 are desired to be so set that the directions of axes of easy light transmission and the directions of axes of light absorption perpendicularly intersect each other (the state of crossed prisms). They may be so set that the light passes therethrough (the state of parallel prisms), depending on the use for which the liquid crystal display device.

Though the polarizing elements 23, 24 may possess the directions of axes of easy light transmission or the directions of axes of light absorption throughout the entire area of the screen, they are desired to possess multiply divided polarization areas. The term "multiple division" as used herein means division of a given area into at least two portions. In a preferred embodiment, the polarizing areas have not more than 8 pixels apiece. Further, in order to obtain excellent characteristics of display, it is desirable for the following reason that one polarizing area should exist in each of the pixels.

When the liquid crystal composition dispersed between the adjacent scattered pieces of polymer resin is arranged in a fixed direction in the presence of application of a voltage or in the absence of application of a voltage, a phase difference is produced by the double refraction component which is decided by the orientation of the liquid crystal composition and the polymer resin. The phase difference possibly prevents sufficient transmission of erasure of the light impinging on the polarizing element in the direction deviating from the axes of easy light transmission or the axes of light absorption. To eliminate this dependency on the viewing angle, it is desirable that the magnitude of anisotropy of refractance of the liquid crystal composition and the polymer resin should be decreased. In the light scattering type liquid crystal display device, the decrease of this magnitude possibly results in degradation of the characteristics of the liquid crystal display device because the state of satisfactory scattering is produced by the magnitude of anisotropy of refractance. Where the liquid crystal display device is not provided with any polarizing element and the dependency on the viewing angle is consequently eliminated, the phenomenon of defective display may possibly ensue because the state of darkness required for a transmission type direct-view display device is not sufficiently formed. When the liquid crystal display device is provided with polarizing elements possessing axes of easy light transmission or axes of light absorption distributed in the shape of concentric rings or in the radial pattern in each of the pixels, fields of view deviating from the axes of easy light transmission or the axes of light absorption cease to exist.

Now, the size of multiply divided areas in the polarizing element will be described more specifically. In the case of a liquid crystal display device which has a display area of 10 to 5 inches, this display area is desired to be multiply divided into areas of a size of from $6 \times 10^{-8} m^2$ to $1 \times 10^{-8} m^2$. In the case of a liquid crystal display device which has a display area of less than 5 inches, the display area is desired to be multiply divided into areas in the range of (display area/total number of pixels) $\times 3$.

The polarizing elements to be used in the present invention can be formed by arranging a dichroic dye using a dichroic coloring matter (such as, for example, iodine molecules) in a specific direction by the dyeing technique. It may otherwise be formed by causing the aforementioned dichroic dye to be adsorbed on a membrane given to be dyed. Alternatively, the dichroic dye may be adsorbed on the surface of a liquid crystal orientation membrane and the resultant dyed membrane may be used together with a liquid crystal composition as a guest-host liquid crystal.

More specifically, the formation of the polarizing elements can be effected by the following method. A polarizing element which possesses polarizing axes distributed in the shape of rings or in the radial pattern in each of minute areas is obtained by preparing a PVA film which has desired divided orientation areas thereof subjected in advance to an orienting treatment and causing a dichroic dye (such as, for example, a product of Nippon Kayaku Co., Ltd. marketed under product code of "LCD-430") to be diffused and adsorbed in the noncrystalline parts of the film surface. When the orientation areas in the shape of rings or in the radial pattern are formed with microgrooves, a polarizing element is obtained by dissolving a dichroic dye (such as, for example, a product of Nippon Kayaku Co., Ltd. marketed under product code of "LCD-430") at a concentration of 5% by weight in a liquid crystal material (such as, for example, a product of Merck marketed under a product code of "ZLI-3276-100") and, by the use of the resultant solution, causing the liquid crystal molecules and the dye molecules to be adsorbed on and oriented along the microgrooves. By using the polarizing elements formed by the method described above in a polymer dispersion type liquid crystal display device, a liquid crystal display device excelling in the characteristics of viewing angle can be perfected without requiring use of a phase compensation element which has been in popular use to date.

That the liquid crystal display device of this invention can be connected to and enabled to drive a driving IC by the conventional method should go without saying.

FIG. 6A and FIG. 6B are model diagrams illustrating the state of liquid crystal orientation in a liquid crystal orientation area near a substrate in a liquid crystal display device of this invention. Incidentally, FIG. 6A and FIG. 6B depict orientation layers possessing directions of orientation respectively in the shape of concentric rings and in the radial pattern. The liquid crystal molecules oriented in the orientation layer are in the shape of concentric rings centered round an pixel near the substrate shown in FIG. 6A and in the radial pattern centering round the center of an pixel near the substrate shown in FIG. 6B. In the liquid crystal display device resorting to the TN type of display, the liquid crystal molecules form a structure twisted by an approximate angle of 90° between the two substrates. The liquid crystal display device, therefore, possesses characteristics of viewing angle (the range of viewing angle in which the contrast exceeds a prescribed value) identical in all of the directions because this structure is symmetrical relative to the rotation of a desired angle of direction round the vertical direction of substrate as an axis. The liquid crystal display device of this invention can densify the state of darkness because it is provided on the opposite sides of the substrate thereof with polarizing elements. As a result, the contrast between the state assumed in the presence of application of a voltage and the state assumed in the absence of the voltage application is exalted. Besides, the liquid crystal display device exhibits improved characteristics of viewing angle when it is provided with such polarizing elements as are possessed of axes of easy light transmission or axes of light absorption in the shape of concentric rings or in the radial pattern in each of the pixels.

The liquid crystal display device which uses a nematic type liquid crystal inclusive of an orientation membrane possessing microgrooves in the shape of concentric rings and in the radial pattern as described above has a low light utilization factor because the directions of orientation of liquid crystal on the substrate chiefly on the light incident side do not coincide with the axes of light transmission of the polarizing element. In the liquid crystal display device of this invention, therefore, the incident light polarizing surface or the incident light side polarizing element is so adapted that the axes of easy light transmission are parallel with the directions in which the liquid crystals on the substrate on the incident light side are oriented. Owing to this arrangement, the polarizing element acquires such polarizing characteristics that the axes of light transmission (optical axes) of the polarizing element will vary from time to time so as to run parallelly with the directions of orientation of liquid crystals formed in the shape of concentric rings, the light utilization factor can be optimized.

The use of the polarizing element of this nature, from the viewpoint of the principle of operation, is equivalent to the use of a nematic type liquid crystal in combination with a polarizing element in the liquid crystal display device, which theoretically attains a light utilization factor of about 50% at most. This liquid crystal display device, however, is enabled to realize a higher light utilization factor by using a guest-host type liquid crystal while omitting the polarizing element. Besides, since liquid crystal molecules are oriented in the shape of concentric rings and in the radial pattern as described above, the conventional biassed characteristics of viewing angle due to the twist of liquid crystal molecules between the substrates can be eliminated because the liquid crystal molecules are oriented in the shape of concentric rings and in the radial pattern as described above.

Even when the liquid crystal display device uses nematic type liquid crystals, the biassed characteristics of viewing angle can be similarly eliminated and the speed of response of liquid crystals can be increased and the durability of liquid crystals can be improved.

As described thus far, this invention realizes a liquid crystal display device which enjoys uniform characteristics of viewing angle as evinced by only sparing dependency of the contrast in the screen on the viewing angle and exhibits such advantageous display properties as high light utilization factor, high luminance, and high contrast.

The present invention can be utilized for a liquid crystal display device which is desired to restrict the direction of viewing angle. For example, a liquid crystal display device which possesses a satisfactory field of view in a desired direction can be obtained by fixing the directions of orientation or polarizing axis in the shape of semirings or in the semiradial state.

BRIEF DESCRIPTION OF THE INVENTION

FIG. 6A is a model diagram illustrating the state of orientation of liquid crystals in the proximity of a substrate depicting the orientation of liquid crystal molecules in the shape of concentric rings. FIG. 6B is a model diagram illustrating the state of orientation of liquid crystals in the proximity of a substrate depicting the orientation thereof in the radial pattern.

FIG. 7 is a diagram illustrating one pixel part of an exposure mask of the TFT substrate.

FIG. 8 is a diagram illustrating one pixel part of the exposure mask of the counter substrate.

DESCRIPTION OF THE PREFERRED EMBODIMENTS

Figure 1A:
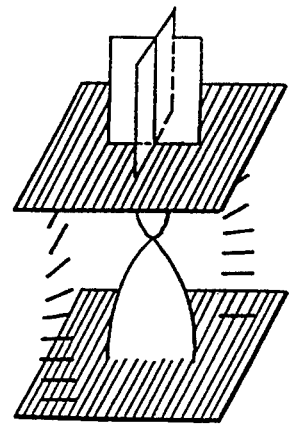
FIG. 1A is a schematic diagram intended to aid in the description of the principle of display by the method of TN type depicting the state assumed in the presence of application of a voltage.
Figure 1B:
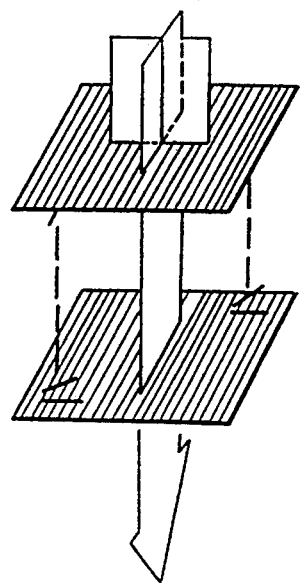
FIG. 1B is a schematic diagram intended to aid in the description of the principle of display by the method of TN type depicting the state assumed in the absence of voltage application.
Figure 2:
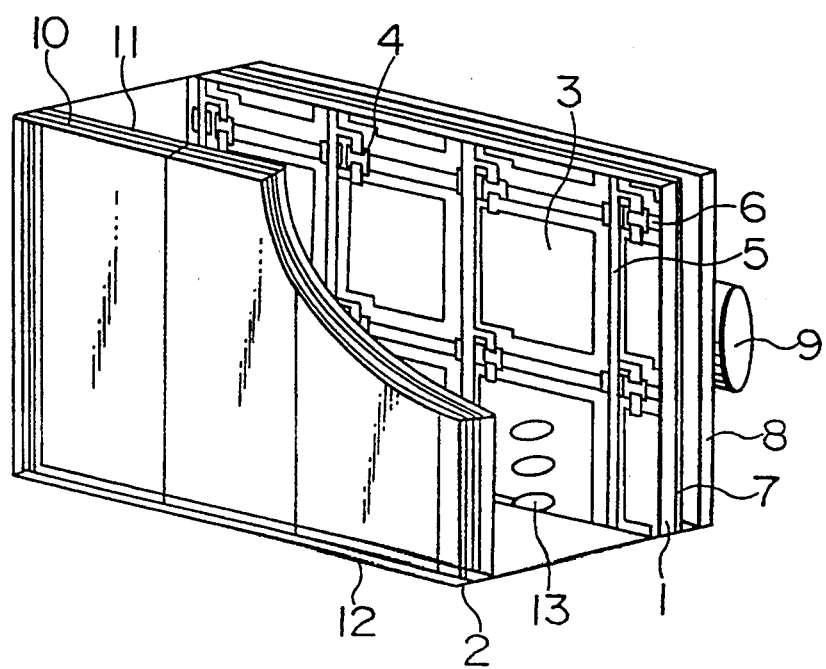
FIG. 2 is a structural diagram illustrating one example of the whole construction of TFT-LCD.
Figure 3:
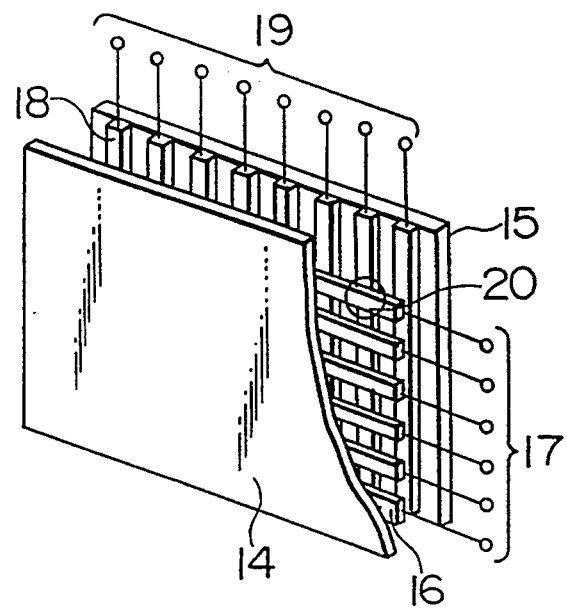
FIG. 3 is a structural diagram illustrating one example of the construction of a liquid crystal display device to be used for display by the method of simple matrix type.
Figure 4:
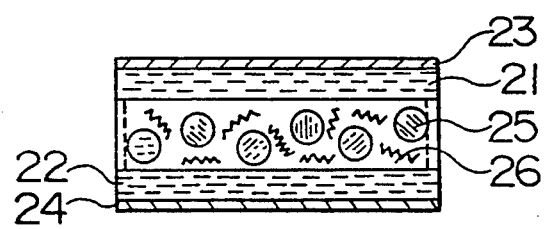
FIG. 4 is a diagram illustrating a cross-sectional construction of a polymer dispersion type liquid crystal display device.
Figure 5:
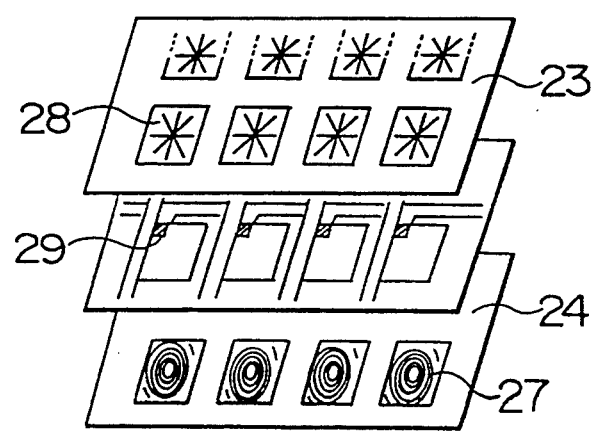
FIG. 5 is a diagram depicting an artist's concept of the state of setting axes of easy light transmission in a polarizing element for the polymer dispersion type liquid crystal display device.

Embodiment 1:

On a glass substrate provided on the surface thereof with a TFT, a 5% solution of a photosensitive polyimide (produced by Ciba Geigy and marketed under trademark designation of "Probimid") was deposited by spin coating carried out at a rate of 3,000 rpm for 25 seconds. Then, the coated glass substrate was heated on a hot plate at 110° C. for 15 minutes to cure the applied layer of the solution.

Then, an exposure mask shaped as shown in FIG. 7 was prepared. FIG. 7 illustrates one pixel part. In FIG. 7, the area ratio of light transmitting parts 31 to light intercepting parts 30 was 1:1 and the width of a bordering line was 1.5 μm. This exposure mask was set at a distance of 6 μm from the surface of the thermally cured film. Through the exposure mask, the film was exposed to a collimated light of 380 mJ/cm$^2$ having a maximum wavelength of 385 nm. Subsequently, this substrate was subjected to spray development. The conditions of this development were as follows.

| | |
|---|---|
| Amount of developer spouted | 10 ml/min. |
| Pressure with nitrogen | 2.5 kg/cm$^2$ |
| Duration of treatment with developer | 60 sec. |
| Overlap time | 10 sec. |
| Rinse time | 15 sec. |
| Nitrogen spin dry time | 10 sec. |

After this developing treatment, the substrate was thermally dried at 250° C. for one hour and left cooling to normal room temperature to form an orientation layer.

On the TFT substrate thus treated, spherical spacers (produced by Sekisui Fine Chemical K.K. and marketed under trademark designation of "Micropearl SP-205") were scattered by spraying.

Meanwhile, on a counter substrate provided on the surface thereof with a color filter furnished with a protective film, an orientation film was formed in the same manner as described above. The exposure mask was shaped as shown in FIG. 8. In FIG. 8, the area ratio of light transmitting parts 31 to light intercepting parts 30 was 1:1, the width of a bordering line was 1.0 μm, and the radius of the innermost circle was 1.0 μm. On the counter substrate thus treated, a thermosetting epoxy resin (produced by Mitsui Toatsu Chemicals Inc. and marketed under trademark designation of "Structobond") was applied as a sealing material by screen printing.

The TFT substrate and the color filter substrate formed as described above were combined in such a manner that the orientation layers thereof were opposed to each other, heated at 180° C. for one hour, and left cooling to normal room temperature to produce a blank cell.

This cell was placed in a vacuum chamber, filled in the cavity thereof with a nematic liquid crystal composition ($\Delta n = 0.081$) (produced by Merck and marketed under product code of "ZLI-2363") under a vacuum, and tightly sealed. The injection port of the cell used for the introduction of the liquid crystal composition was sealed with an ultraviolet-curing adhesive agent. Then, the cell was cleaned. To the outer sides of the TFT substrate and the color filter substrate of the filled cell, polarizing elements were applied fast one each in such a manner that their respective polarizers perpendicularly intersected each other. Thus, a liquid crystal display device the TN type fit for the display of the active matrix type was obtained.

The liquid crystal display device thus obtained was tested for the following properties.

1) Characteristic of state of orientation in the absence of application of voltage (by observation under a microscope).

2) V-T characteristic (relation between voltage and amount of light transmission of liquid crystal cell).

3) Characteristic of viewing angle in the vertical direction [range of angle of incident light in which the contrast (ratio of amounts of light transmission in the absence and the presence of application of voltage) is not less than 10:1].

4) Characteristic of viewing angle in the lateral direction [range of angle of incident light in which the contrast (ratio of amounts of light transmission in the absence and the presence of application of voltage) is not less than 10:1].

5) State of display of a moving image after 500 hours'-life test at an elevated temperature (85° C.).

The results of the test are shown in Table 1.

Figure 9:
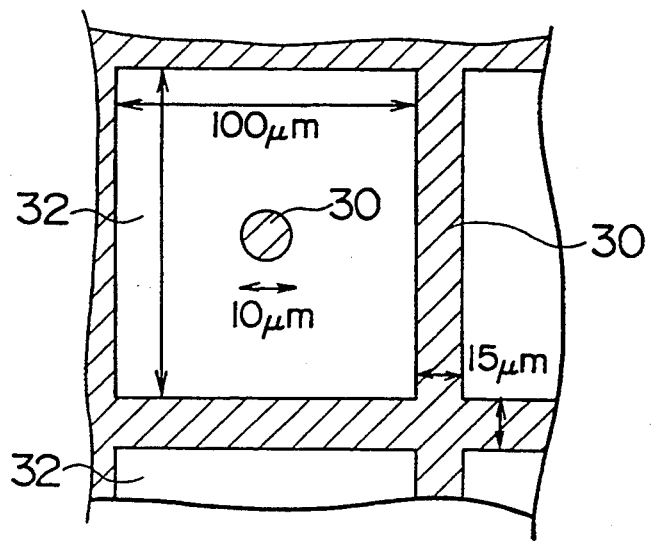
FIG. 9 is a diagram illustrating a color filter furnished with a protective membrane and used on the counter substrate.

Embodiment 2:

A liquid crystal display device was obtained by following the procedure of Embodiment 1 excepting a dot of light intercepting part 30 was formed at the center of one pixel of a color filter part 32 as illustrated in FIG. 9 in a color filter furnished with a protective film and formed on the counter substrate.

The liquid crystal display device thus obtained was tested for the properties in the same manner as in Embodiment 1. The results of test are shown in Table 1.

Figure 10:
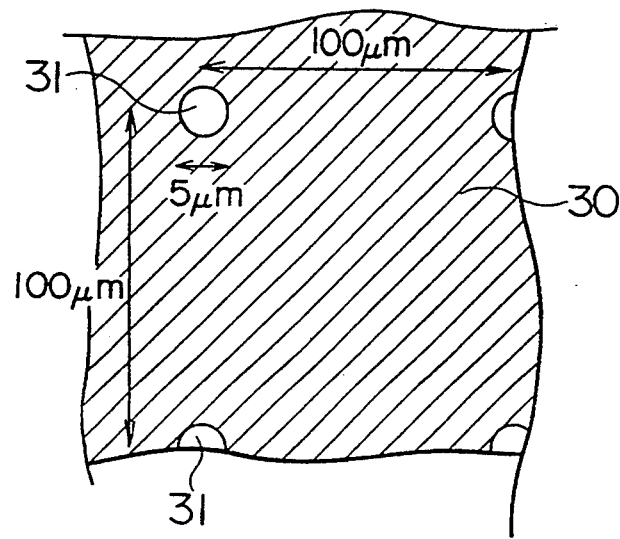
FIG. 10 is a diagram illustrating an exposure mask to be used for the formation of a columnar spacer.

Embodiment 3:

On a glass substrate having a TFT formed on the surface thereof, an orientation layer was deposited in the same manner as in Embodiment 1 and then a photosensitive polyimide (produced by Ciba Geigy and marketed under trademark designation of "Probimid 412") was superposed by spin coating carried out at a rate of 2,000 rpm for 25 seconds. Then, the coated glass substrate was heated on a hot plate at 110° C. for 15 minutes to cure the applied coat. Subsequently, an exposure mask shaped as shown in FIG. 10 was placed at a distance of 6 μm from the surface of the thermally cured film. The film was exposed through the exposure mask to a collimated light of 380 mJ/cm$^2$ having the maximum wavelength of 365 nm. This substrate was then subjected to spray development. The conditions of this development were as follows.

| | |
|---|---|
| Amount of developer spouted | 10 ml/min. |
| Pressure with nitrogen | 2.5 kg/cm$^2$ |
| Duration of treatment with developer | 240 sec. |

| | -continued | |
|---|---|---|
| Overlap time | | 10 sec. |
| Rinse time | | 10 sec. |
| Nitrogen spin dry time | | 20 sec. |

After the developing treatment, the substrate was dried at 200° C. for one hour and left cooling to normal room temperature to form a TFT substrate provided with columnar spacers 5 μm in height.

A liquid crystal display device was produced with the resultant TFT substrate by following the procedure of Embodiment 1 while omitting the use of spherical spacers.

"Structobond") was applied as a sealing material by screen printing.

The TFT substrate and the color filter substrate formed as described above were combined in such a manner that their respective orientation layers were opposed to each other, heated at 180° C. for one hour, and left cooling to normal room temperature to produce a blank cell. Thereafter, a liquid crystal display device of the method of display of the TN type was produced by following the procedure of Embodiment 1 using the same liquid crystal composition as in Embodiment 1.

The liquid crystal display device thus obtained was tested for properties in the same manner as in Embodiment 1. The results of test are shown in Table 1.

TABLE 1

| | Embodiment 1 | Embodiment 2 | Embodiment 3 | Embodiment 4 | Comparative Experiment |
|---|---|---|---|---|---|
| Property 1 | Normal | Normal | Normal | Normal | Normal |
| Property 2 | UP 50° | UP 60° | UP 50° | UP 55° | UP 40° |
| | DOWN 45° | DOWN 55° | DOWN 50° | DOWN 55° | DOWN 20° |
| Property 3 | RIGHT 50° | RIGHT 60° | RIGHT 50° | RIGHT 60° | RIGHT 45° |
| | LEFT 50° | LEFT 60° | LEFT 50° | LEFT 60° | LEFT 45° |

Note)
Property 1: V-T characteristic (relation between voltage and amount of transmitting light of liquid crystal cell).
Property 2: Contrast (range of angle of incident light in the vertical direction in which the ratio of amounts of light of transmission in the presence of application of voltage and the absence of voltage application).
Property 3: Contrast (same as above, excepting the direction of incident light was lateral).

The liquid crystal display device consequently obtained was tested for properties in the same manner as in Embodiment 1. The results of test are shown in Table 1.

Embodiment 4:

A liquid crystal display device was obtained by following the procedure of Embodiment 3 excepting a dot of light intercepting part 30 was formed at the center of one pixel as shown in FIG. 9 in a color filter furnished with a protective film and formed on the counter substrate.

The liquid crystal display device thus obtained was tested for the properties in the same manner as in Embodiment 1. The results of test are shown in Table 1.

Comparative Experiment 1:

On a glass substrate having a TFT formed on the surface thereof, a thermosetting polyimide (produced by Japan Synthetic Rubber Co., Ltd. and marketed under trademark designation of "Optomer-AL-1051") was applied by the use of a roll coater. The coated glass substrate was heated at 200° C. for one hour to cure the applied layer. The polyimide film thus obtained on the glass substrate was subjected to an orienting treatment by the rubbing method using a roller covered with cloth.

On the TFT substrate thus treated, spherical spacers (produced by Sekisui Fine Chemical K.K. and marketed under trademark designation of "Micropearl SP-205") were scattered by spraying.

Meanwhile, on a counter substrate provided on the surface thereof with a color filter furnished with a protective film, a thermosetting polyimide (produced by Japan Synthetic Rubber Co., Ltd. and marketed under trademark designation of "Optomer-AL-1051") was applied by the use of a roll coater. The coated glass substrate was heated at 200° C. for one hour to cure the applied layer. The polyimide film thus obtained on the glass substrate was subjected to an orienting treatment by the rubbing method using a roller covered with cloth. On the resultant counter substrate, a thermosetting epoxy resin (produced by Mitsui-Toatsu Chemicals Ltd. and marketed under trademark designation of The test results clearly indicate that the liquid crystal display devices according with this invention excelled the liquid crystal display device of the comparative experiment in terms of orientation of liquid crystal and acquired satisfactory and uniform characteristics of viewing angle.

Embodiment 5:

On a glass substrate having a TFT formed on the surface thereof, spherical resin spacers were scattered by spraying. Meanwhile, on a glass substrate having a counter electrode formed thereon, a thermosetting epoxy resin (produced by Mitsui-Toatsu Chemicals Ltd. and marketed under trademark designation of "Structobond") was deposited as a sealing material by screen printing. Then, the TFT substrate and the counter substrate were combined, heated at 180° C. for one hour, and left cooling to normal room temperature to produce a blank cell. The polymer dispersion was formed in a thickness of 13 μm. This blank cell was placed in a vacuum chamber, filled in the cavity thereof under a vacuum with a polymer dispersion type liquid crystal material shown below, and exposed to an ultraviolet light to cure the liquid crystal material and complete a liquid crystal cell.

| | |
|---|---|
| Monomer: Ethylhexyl acrylate | 15.8 wt % |
| Oligomer: Product of Toa Goesi (Kayard HX-620) | 4.0 wt % |
| Liquid crystal material: Product of Merck (E7) | 79.2 wt % |
| Photopolymerization initiator: Product of Merck (Darocur 1173) | 1.0 wt % |

The resultant liquid crystal cell was cleaned. To the outer sides of the TFT substrate and the counter substrate, polarizing elements possessed of axes of easy light transmission or axes of light absorption in the shape of concentric rings or in the radial pattern in each of the pixels were attached one each after the fashion of crossed prisms. Thus, a polymer dispersion type liquid crystal display device to be used for the display of the active matrix type.

The liquid crystal display device was found to have a contrast (the ratio of amounts of light transmission in the absence of application of voltage and the presence of voltage application) of not less than 40:1. The range of angle of light incidence at this contrast was found to be 60° up and 60° down in the vertical direction and 60° right and 0° left in the lateral direction.

As materials for the formation of the polymer dispersion type liquid crystal, such ultraviolet-curing type monomers as n-butyl acrylate and lauryl acrylate, oligomers (such as, for example, products of Toa Gosei Chemical Industry Co., Ltd. marketed under trademark designations of "Aronix M-1120 and M-1200" and a product of Shinnakamura Kagaku K.K. marketed under trademark designation of NK-Oligo U-4HA"), liquid crystal materials (such as, for example, a product of Merck marketed under product code of "E8"), and photopolymerization initiators (such as, for example, a product of Merck marketed under trademark designation of "Darocur 1116") are effectively usable.

Comparative Experiment 2:

A liquid crystal display device was produced by following the procedure of Embodiment 5 while omitting the attachment of polarizing elements one each to the outer sides of the TFT substrate and the counter substrate.

This liquid crystal display device was found to have a contrast of about 1:3. The range of angle of incidence of light at this contrast was found to be 60° up and 60° down in the vertical direction and 60° right and 60° left in the lateral direction.

Figure 11:
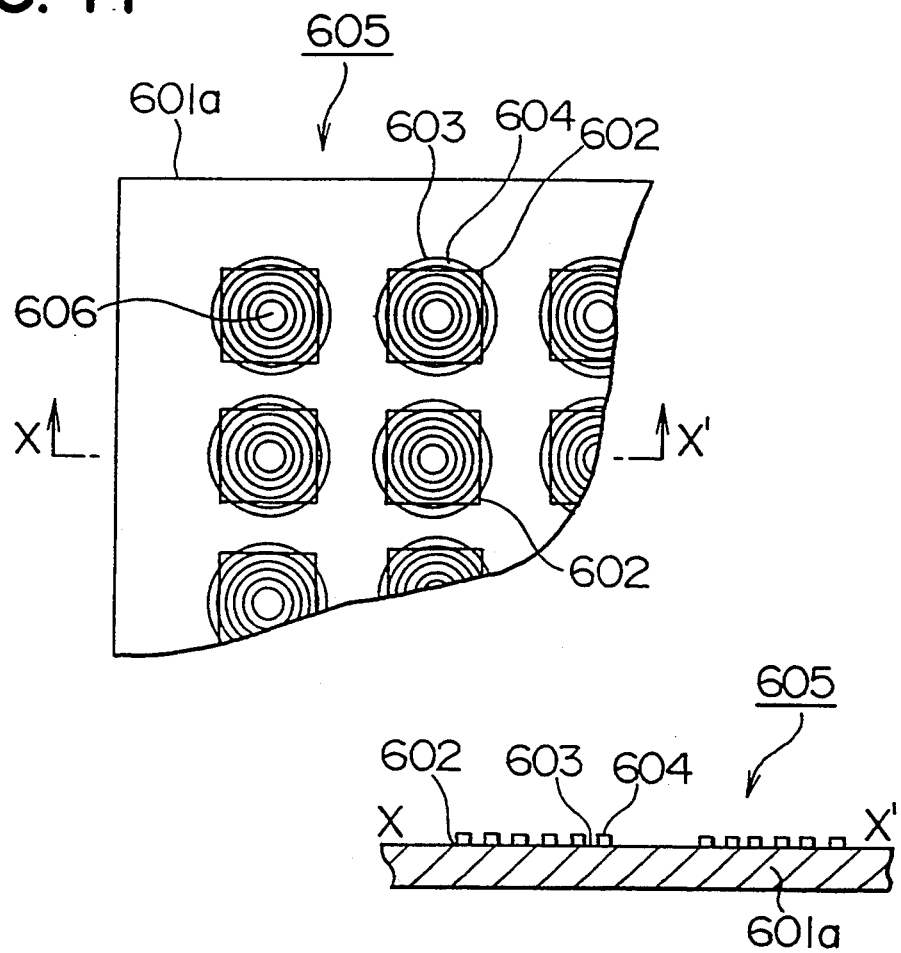
FIG. 11 is a diagram illustrating the construction of a first substrate used in a liquid crystal display device of Embodiment 6.
Figure 12:
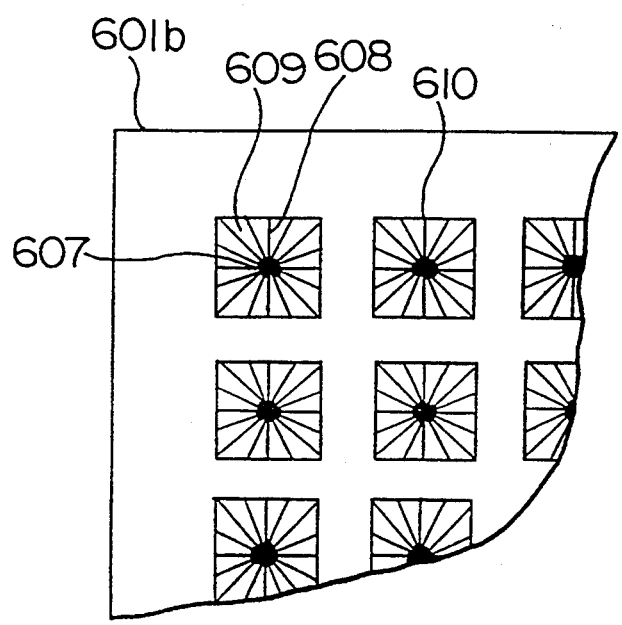
FIG. 12 is a diagram illustrating the construction of a second substrate used in the liquid crystal display device of Embodiment 6.
Figure 13:
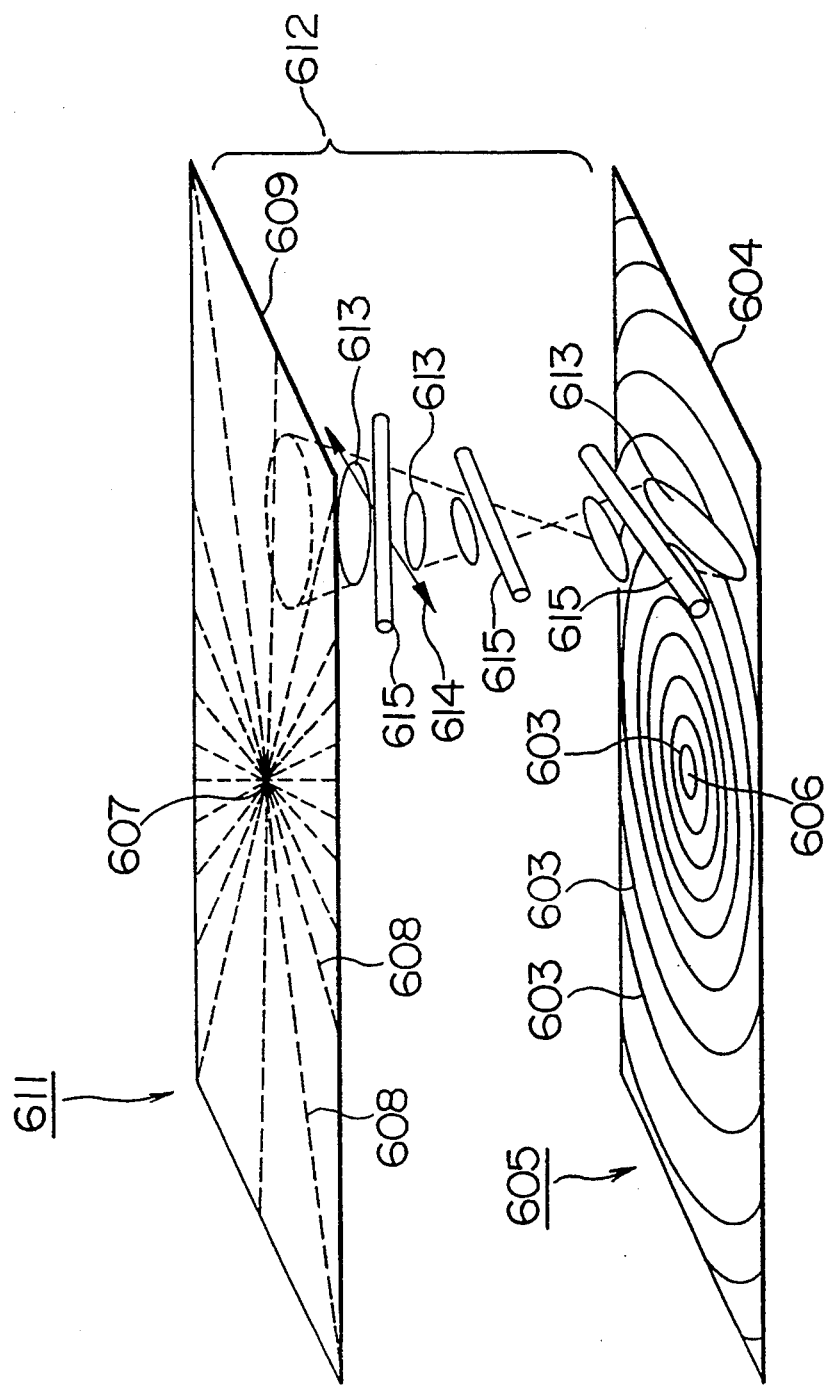
FIG. 13 is a diagram illustrating the construction of the liquid crystal display device of Embodiment 6.

Embodiment 6:

FIGS. 11, 12, and 13 are diagrams illustrating the construction of a liquid crystal display device of Embodiment 6. A first substrate 605 was prepared by forming pixel electrodes 602 of a transparent electroconductive film in the form of a matrix on a glass substrate 601(a), depositing thereon a film of liquid crystal orientation film material, and inscribing first microgrooves 603 in the shape of concentric rings in the liquid crystal orientation film thereby forming a first liquid crystal orientation film 604. A second substrate 611 was prepared by following the procedure described above while inscribing second microgrooves 608 in the radial pattern in each of pixels 610 on a second liquid crystal orientation film 609 superposed on a glass substrate 601(b) in such a manner that centers of the radially formed second microgrooves 608 overlay the centers 606 of the concentric rings of the first microgrooves 603. The first substrate 605 and the second substrate 611 were opposed to each other across a gap and joined by forming a combination spacer and sealing material (omitted from illustration) across the intervening gap along the matched edges thereof to complete a liquid crystal display panel.

The first microgrooves 603 and the second microgrooves 608 could be formed accurate in a desired shape by forming a film of such liquid crystal orientation film material as polyimide and then inscribing minute grooves in the shape of concentric rings or in the radial pattern in the surface of the film as by the photolithographic technique.

On the first microgrooves 603 formed in the shape of concentric rings on the first substrate 605 as illustrated in FIG. 13, liquid crystal molecules 613 of the liquid crystal layer 612 were oriented after the pattern of concentric rings. Meanwhile, on the second microgrooves 608 formed in the radial pattern on the second substrate 611, liquid crystal molecules 613 were oriented radially along the second microgrooves 608. In the completed liquid crystal cell, therefore, a nematic structure twisted by about 90° C. (twisted nematic: TN) was formed between the two substrates 605, 611. Moreover, the spirals of the nematic structures of the liquid crystal molecules 613 in each of the pixels were so formed as to appear isotropically at any viewing angle.

When a dichroic dye having an absorption moment 614 in a direction perpendicular to the major axis of molecule was added to the liquid crystal display panel of the form of a blank cell constructed as described above, dye molecules 615 were oriented along the direction of orientation of the liquid crystal molecules 613 and arrayed as twisted in the pattern of the twisted nematic structure in the gap between the opposed substrates to give rise to a guest-host type liquid crystal cell. When a light was injected into this liquid crystal cell, the polarizing component of the light perpendicular to the dye molecules 615 of the dichroic dye oriented on the light incidence side substrate was absorbed and the light possessing a polarizing plane along an optical axis formed in consequence of the orientation of the liquid crystal molecules 613 of the twisted nematic structure existing in each of the pixels was allowed to continue its advance. Thus, the utilization factor of the incident light in this part of the plane for incidence of light could be optimized. The characteristics of viewing angle were satisfactory because the twisted structure of the liquid crystal molecules 613 in any one of the pixels 610 between the two substrates appeared isotropically as viewed in any direction. From the standpoint of the principle of operation, the liquid crystal display device obviated the necessity of using a polarizing element because the transmission of light was controlled by effecting change of posture by the use of the guest-host type liquid crystal. Thus, the heretofore inevitable loss of the light utilization factor (theoretically 50%) due to the use of a polarizing element could be eliminated and uniform display of high luminance and high contrast could be realized.

Further, the dye molecules 615 were oriented in virtually the same direction as the direction of major axis of the liquid crystal molecules 613 and the absorption moment 614 of the dye molecules 615 was exerted in a direction perpendicular to the direction of major axis mentioned above and, as a result, the absorption moment 614 of the dye molecules 615 formed its course in a direction perpendicular to the direction of major axis of the liquid crystal molecules 613. In the display of black requiring thorough interception of the light in transmission, therefore, the state of display of satisfactory darkness could be realized because the light was intercepted thoroughly by the dichroic dye. Thus, the display of high contrast ratio could be realized.

Figure 14:
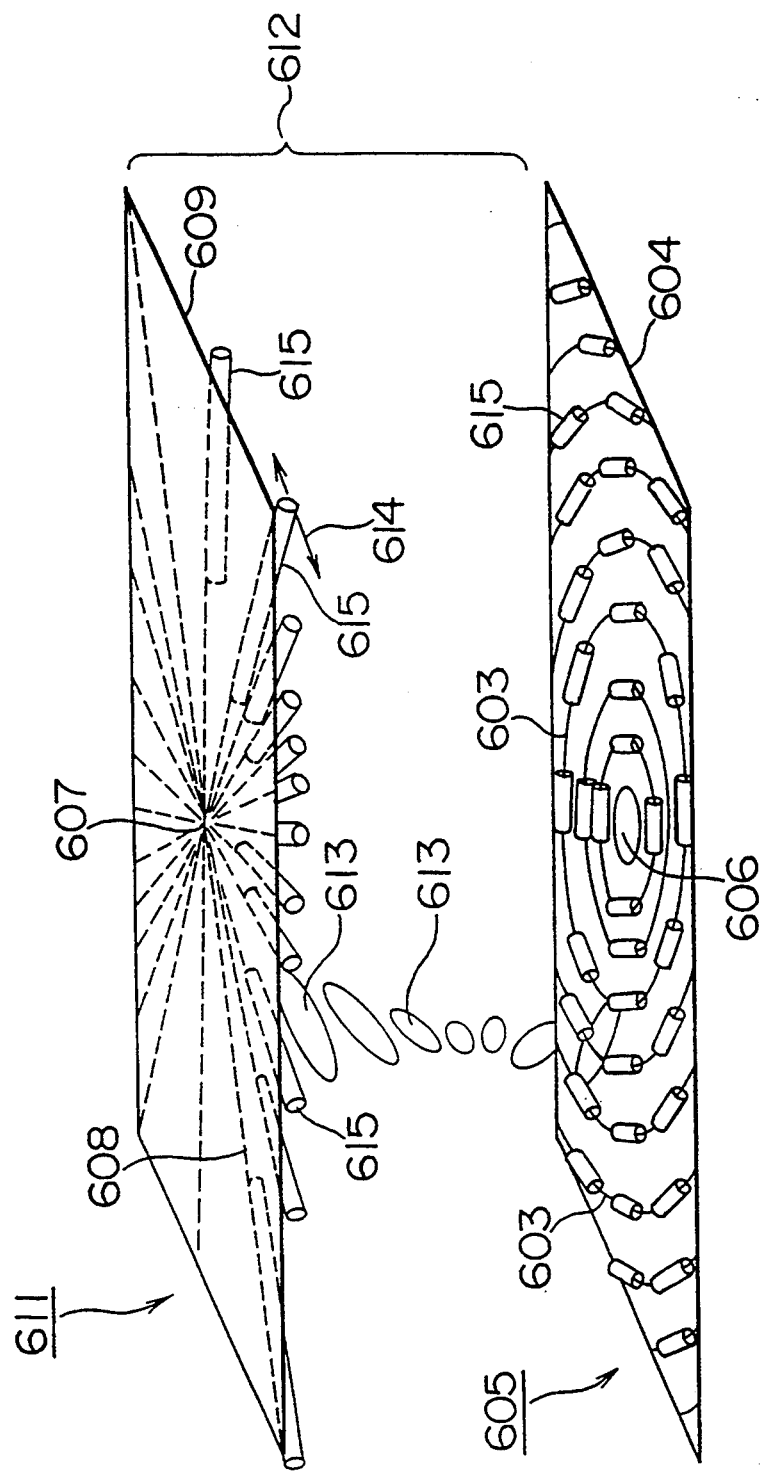
FIG. 14 is a diagram illustrating the construction of a liquid crystal display device in Embodiment 7.

Embodiment 7:

FIG. 14 is a diagram illustrating the construction of a liquid crystal display device of Embodiment 7. In the following description of this construction, the same parts of construction as those of the construction of Embodiment 6 will be designated by the same reference numerals as used in the diagram of Embodiment 6 for the sake of brevity of description.

A first liquid crystal orientation film 604 having first microgrooves 603 formed therein in the shape of concentric rings was superposed on a first substrate 605 as illustrated in FIG. 14 and a second liquid crystal orientation film 609 having second microgrooves 608 formed in the radial pattern was superposed on a second substrate 611. The first substrate 605 and the second substrate 611 were opposed to each other in such a manner that the center 606 of the concentric rings overlay the center 607 of the radial pattern. As the materials for the first and second liquid crystal orientation films 604, 609, a film of such material as casein exhibiting a highly satisfactory ability to adsorb a dichroic dye as described specifically afterward was used. As concrete examples of the material for the film excelling in the ability to adsorb the dichroic dye, polyvinyl alcohol, gelatin, polyacryl amide, polymethacryl amide, and acryl type polymers containing an amino group or a quatrnary ammonium salt in the side chain of molecule may be cited in addition to the casein.

The two substrates 605, 611 opposed to each other across a gap were joined by forming a combination spacer and sealing material (omitted from illustration) across the intervening gap along the matched edges of the substrates to form a blank cell. A liquid crystal composition incorporating therein a dichroic dye (dye molecules 615) having an absorption moment 614 exerted in a direction perpendicular to the major axis of molecule and exhibiting a highly satisfactory ability to be adsorbed to the substrates was injected into the blank cell and interposed therein between the opposed substrates.

The dye molecules 615 of the dichroic dye were oriented parallelly with the direction of orientation of the liquid crystal molecules 613 and were adsorbed as held in the oriented direction to the liquid crystal orientation films 604, 609. Since the dye molecules 615 of the dichroic dye were adsorbed completely to the surfaces of the liquid crystal orientation films 604, 609, no dye molecule 615 remained in the liquid crystal layer 612 so to speak existing in the gap between the two substrates 605, 611. As a result, the liquid crystal molecules 613 were exclusively oriented along the microgrooves 603, 608 on the surfaces of the liquid crystal orientation films 604, 609 of the upper and lower substrates 605, 611 and spirally chained in the direction of thickness of the liquid crystal layer 612 and allowed to give rise to a 90° twisted nematic structure between the two substrates 605, 611. Thus, a polarizing element possessing axes of polarization substantially along the axes of light transmission of the liquid crystal molecules 613 was formed with the dye molecules 615 of the dichroic dye adsorbed on the surfaces of the first and second liquid crystal orientation films 604, 609. Moreover, these liquid crystal orientation films 604, 609 had microgrooves 603, 608 formed on the surfaces and, as a result, endowed with an ability to orient the liquid crystal molecules 613. Between the two substrates 605, 611, no dye molecule of the dichroic dye remained and the liquid crystal molecules 613 were retained to form the twisted nematic (TN) structure.

By the method for adsorbing a dichroic dye to the surfaces of liquid crystal orientation films as demonstrated in Embodiment 7, a liquid crystal display device which has formed substantially therein a polarizing element possessing polarizing axes along the axes of light transmission of liquid crystal molecules can be produced very easily.

Figure 15:
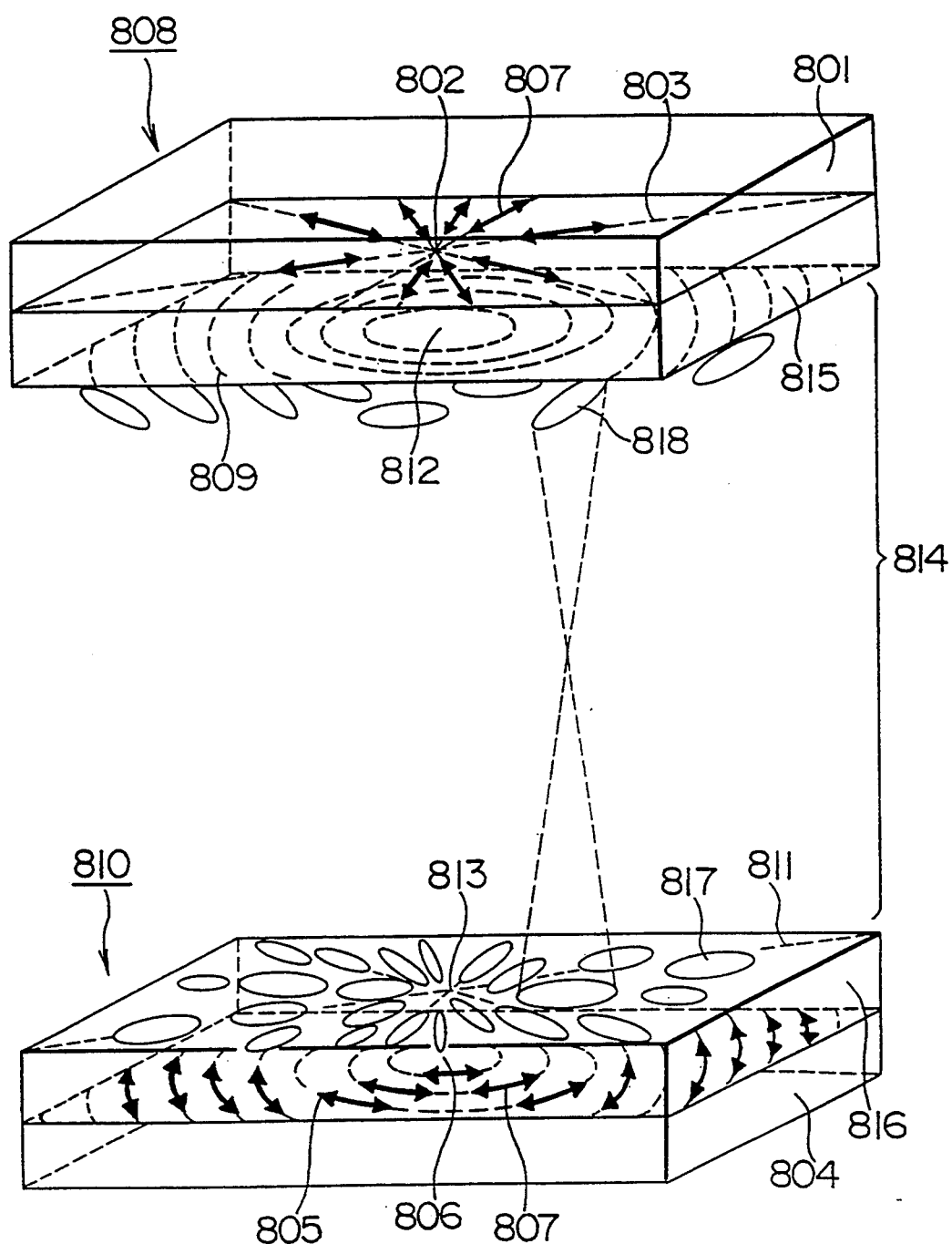
FIG. 15 is a diagram illustrating the construction of a liquid crystal display device of Embodiment 8.

Embodiment 8:

FIG. 15 is a diagram illustrating the construction of a liquid crystal display device of Embodiment 8.

On a first glass substrate (in FIG. 15, the glass substrate itself is omitted from illustration for the sake of brevity of description), a first film 801 to be dyed was formed with such a material as casein, PVA (polyvinyl alcohol), gelatin, polyacryl amide, polymethacryl amide, or an acryl type polymer containing an amino group or a quaternary ammonium salt in the side chain of molecule which possessed a satisfactory affinity for a dichroic dye to be described specifically afterward. On the surface of the film 801, a plurality of first linear microgrooves 803 were incised as radially extended from a center 802.

Meanwhile, on a second glass substrate (similarly omitted from illustration), a second film 804 to be dyed was formed in the same manner as described above. On the surface of the second film 804, second microgrooves 805 to be dyed were incised in the shape of concentric rings.

Then, the first glass substrate and the second glass substrate were opposed to each other across a gap in such a manner that the center 806 of the concentric rings of the second microgrooves 805 for dyeing coincided with the center 802 of the radial pattern of the first microgrooves 803 for dyeing and joined by forming a combination spacer and sealing material (omitted from illustration) across the intervening gap between the matched edges of the two substrates to form a blank cell. A TN type liquid crystal composition (omitted from illustration) incorporating therein a dichroic dye having an absorption moment 807 exerted parallelly to the major axis of molecule and exhibiting a satisfactory dyeability to the aforementioned films 801 and 804 was injected into the blank cell. Consequently, the dye molecules of this dichroic dye were oriented by following the direction of orientation of the TN type liquid crystal molecules. Since the liquid crystal molecules were oriented along the directions of the microgrooves 803, 805 respectively incised in the films 801, 804, the dye molecules were adsorbed on the films 801, 804 as oriented along the microgrooves 803, 805. As a result, the microgrooves 803, 805 were anisotropically dyes with the dichroic dye and the absorption moments 807 were arranged respectively along the microgrooves 803, 805 as illustrated in FIG. 15.

Thus, the aforementioned films 801, 804 to be dyed were formed substantially as a first and a second polarizing element having absorption moments 807 or the directions of polarization distributed in directions along the microgrooves 803, 805.

After the dichroic dye had been deposited on the films 801, 804 to be dyed and these films 801, 804 had been amply dyed, the liquid crystal composition incorporating dye molecules and TN type liquid crystal molecules therein was removed from the gap between the two substrates and, at the same time, the two joined substrates were separated from each other.

On the inner side surfaces of these substrates, namely the surfaces of the films 801, 804 on which the microgrooves 803, 305 had been incised, films of a liquid crystal orienting film material were deposited as a flattening resin to flatten the surfaces mentioned above. On the flattened surfaces of the films thus deposited, microgrooves for liquid crystal orientation were incised again. Naturally, the flattening resin used herein as the material for the formation of liquid crystal orienting films is desired to be made of a substance advantageously usable for the liquid crystal orientation films.

On a first substrate 808 on which the first microgrooves 803 had been formed in the radial pattern and the directions of polarization distributed in the radial pattern, first microgrooves 809 for liquid crystal orientation were incised in the shape of concentric rings.

Meanwhile, on a second substrate 810 on which the second microgrooves 805 for dyeing had been formed in the shape of concentric rings and the directions of polarization distributed in the shape of concentric rings, second microgrooves 811 for liquid crystal orientation were incised in the radial pattern.

In this case, the first substrate 808 and the second substrate 810 were accurately aligned so that on the first substrate 808 side, the center 802 of the first microgrooves 803 for dyeing coincided with a center 812 of the concentric rings of the first microgrooves 809 for liquid crystal orientation and, on the second substrate 810 side, a center 806 of the concentric rings of the second microgrooves 805 for dyeing coincided with a center 813 of the second microgrooves 811 for liquid crystal orientation. Then, the two substrates 808, :310 were opposed and joined to each other as accurately aligned. Then, they were fixed by forming a combination spacer and sealing material (omitted from illustration) across the intervening gap along the matched edges to form a blank cell. The TN type liquid crystal composition was injected into the blank cell to form a liquid crystal layer 814 in the twisted nematic structure in the gap between the two substrates.

In the liquid display device of Embodiment 8, the first film 801 for dyeing and the second film 804 for dyeing were anisotropically dyed and gave rise to substantial equivalents to a first polarizing element and a second polarizing element. The layers of a liquid crystal orienting film material respectively superposed on the first and second films constituted themselves a first film 815 for liquid crystal orientation and a second film 816 for liquid crystal orientation.

The liquid crystal display device consequently produced enjoyed a high light utilization factor because the directions 807 of polarization of the first polarizing element and the second polarizing elements formed respectively by the aforementioned films 801, 804 for dyeing were optimized at each of the relevant places so as to admit an incident light possessing a polarization plane along the optical axis of the TN structure of liquid crystal molecules 818 on the first film 815 for liquid crystal. The liquid crystal display device also enjoyed high symmetry of rotation and satisfactory characteristics of viewing angle because each of the pixels produced an isometric view in all the directions.

The liquid crystal display device of the present Embodiment constituted a so-called normally white mode liquid crystal device characterized by producing the largest light transmittance in the absence of application of a voltage.

A liquid crystal display device of a so-called normally black mode (characterized by producing the smallest light transmittance in the absence of application of voltage) can be produced, unlike the liquid crystal display device of the present Embodiment, by incising the first microgrooves for dyeing in the shape of concentric rings and the first microgrooves for liquid crystal orientation in the shape of concentric rings on the first substrate 808 and incising the second microgrooves for dyeing in the radial pattern and the second microgrooves for liquid crystal orientation in the radial pattern on the second substrate 810 (so that the dye molecules were enabled to produce an absorption moment parallelly with the major axis of molecule in the same manner as in the Embodiment described above). The liquid crystal display devices produced as described above enjoyed high light utilization factors because the directions of polarization of the films 801, 804 for dyeing as the polarizing elements and the directions of orientation of the liquid crystal molecules on the liquid crystal orientation films formed the optimum combinations at all of the places. Moreover, the dependency of contrast on the viewing angle was eliminated and the characteristics of viewing angle were improved conspicuously because the nematic structure of the liquid crystal layer formed in this case was isometric in all of the direction in each of the pixels. Thus, display of uniform and high contrast in all the directions could be realized.

Further, by the method for dyeing the films 801, 804 for dyeing described in Embodiment 8, a polarizing element having the optimum directions of polarization distributed parallelly with the directions of orientation of the liquid crystal molecules at any of the relevant places could be produced very easily. It is optional to produce a liquid crystal display device according with this invention by preparing unitary polarizing elements by the technique contemplated by this invention and combining these polarizing elements with a separately formed liquid crystal panel already provided with microgrooves.

Incidentally, the microgrooves used in the working examples cited above could be accurately formed on a photosensitive polymer film 100 to 300 nm in thickness by using the photolithographic technique.

The liquid crystals could be oriented satisfactorily by setting the pitch between the successive microgrooves at a distance in the range of 1 to 3 $\mu$m.

The microgrooves are desired to be incised to a depth in the range of 50 to 500 nm.

The Embodiment cited thus far represent cases combining microgrooves formed in the shape of concentric rings on one substrate with microgrooves formed in the radial pattern on the other substrate. This particular combination is not critical to the present invention. It is optional to combine microgrooves formed in the shape of hyperbolas on one substrate with microgrooves formed in the shape of ellipses on the other substrate. Thus, the microgrooves may be formed in the pattern of a so-called group of orthogonal curves,.

As demonstrated already in one example, it is allowable to form microgrooves in the shape of concentric rings on each of the two substrates or to form microgrooves in the radial pattern on each of the substrates.

Embodiment 9:

Two glass substrates each having a TFT formed on the surface thereof were prepared. A film of polyimide (produced by Japan Synthetic Rubber Co., Ltd. and marketed under trademark designation of "Optomer AL1051") for orientation was formed on the surface of one of the glass substrate and a film of polyvinyl pyridine for orientation was formed on the surface of the other substrate. Then, hemispherical pieces of silicone rubber disposed one each in the multiply divided areas for orientation were attached fast to the surface of a film for orientation to impart an effect of stretching the film for orientation outwardly from the apexes of the hemispherical pieces. In consequence of this treatment, a phase boundary capable of forming radial orientation was formed on the film of polyimide for orientation and a phase boundary capable of annular orientation was formed on the film of polyvinyl pyridine for orientation. Thus, one layer oriented in the annular pattern and the other layer oriented in the radial pattern could be obtained without forming microgrooves in the annular pattern or the radial pattern. In the place of the polyvinyl pyridine mentioned above, any of polymer materials (such as, for example, polyvinyl carbazole and polystyrene derivatives) exhibiting the ability of orientation such that the major axes of liquid crystal molecules intersected perpendicularly the main chains of polymers re-oriented by the effect of stretching could be effectively used. The treatment of this nature can be applied to the formation of coloring matter-adsorbing layers of polarizing elements.

A liquid crystal display device was produced by following the procedure of Embodiment 1 while using the aforementioned layers for orientation instead. The liquid crystal device was tested for properties in the same manner as in Embodiment 1. The results of test clearly indicate that the liquid crystals were ideally oriented and that the device acquired satisfactory and uniform characteristics of viewing angle.

Embodiment 10:

Two glass substrates each having a TFT formed on the surface thereof were prepared. On each of the surfaces of the glass substrates, a film of polyimide (produced by Japan Synthetic Rubber Co., Ltd. and marketed under trademark designation of "Optomer-AL1051") for orientation was formed by the gravure printing technique. The treatment for annular orientation was performed in each of the multiply divided areas of orientation on the surface of one of the films for orientation and the treatment for radial orientation performed similarly on the surface of the other film for orientation. To be specific, cylindrical pieces of silicone rubber disposed similarly to the hemispherical pieces of silicone rubber used in Embodiment 9 were applied fast and were twisted by an angle of 1° to 2° C. to give rise to a layer for orientation which was endowed with an ability to effect circular stretching from the apexes of the cylindrical pieces of silicone rubber. Alternatively, the same hemispherical pieces of silicone rubber as used in Embodiment 9 were applied fast to give rise to a layer for radial orientation capable of producing a radial stretching. Then a liquid crystal cell was constructed and heated at 110°. Into the liquid crystal cell so heated, a liquid crystal material (produced by Merck and marketed under product code of "ZLI-3276-100") incorporating therein 5 % by weight of a dichroic coloring matter (product of Nippon Kayaku Co., Ltd. and marketed under product code of "LCD-430") was injected. Then, a coloring matter was diffused and adsorbed on the boundary surface of the film for orientation to give rise to a polarizing element part. Subsequently, the dye-containing liquid crystals still remaining in the liquid crystal cell were removed from the cell and a liquid crystal material (produced by Merck and marketed under product code of "ZLI-3276-100") having a chiral dopant incorporated therein at a ratio of cell gap to chiral pitch was injected again into the liquid crystal cell. Thereafter, a liquid crystal display device was obtained by following the procedure of Embodiment 1. This liquid crystal display device was tested for properties in the same manner as in Embodiment 1. The results of test clearly indicate that the liquid crystals were ideally oriented and the device acquired satisfactory and uniform characteristics of viewing angle.

What is claimed is:

1. A liquid crystal display device comprising:
two electrode-attached substrates formed by sequentially superposing electrode layers and orientation layers on said substrates and disposed so as to oppose said orientation layers to each other across a gap, and a liquid crystal composition placed in said gap and consequently interposed between said two electrode-attached substrates, said orientation layers being furnished with multiply divided liquid crystal orientation areas, and each of said orientation areas severally having directions of orientation set either in a radial pattern or in the shape of concentric rings.

2. A liquid crystal display device according to claim 1, wherein the orientation layer on one of said two electrode-attached substrates is in the shape of concentric rings and the orientation layer on the other electrode-attached substrate is in the radial pattern and the central parts of said concentric rings or in said radial pattern coincide vertically with the central parts of said multiply divided liquid crystal orientation areas.

3. A liquid crystal display device according to claim 2, wherein said liquid crystal orientation areas in said two electrode-attached substrates have not more than 8 pixels apiece.

4. A liquid crystal display device according to claim 3, wherein said liquid crystal orientation areas in said two electrode-attached substrates have one pixel apiece.

5. A liquid crystal display device according to claim 1, wherein said liquid crystal composition is a nematic type liquid crystal possessing such a state of orientation that the average direction of major axis of molecule is twisted by 90°.

6. A liquid crystal display device according to claim 1, wherein said liquid crystal composition is a guest-host type liquid crystal having liquid crystal molecules and dye molecules oriented along said direction of orientation.

7. A liquid crystal display device according to claim 1, wherein said orientation layers of said two electrode-attached substrates are produced by formation of microgrooves.

8. A liquid crystal display device according to claim 1, wherein said orientation layer on one of said two electrode-attached substrates is formed of an orienting film having liquid crystal molecules oriented in a direction perpendicular to the direction in which the stretching effect is produced and the orientation layer on the other substrate is formed of an orientation film having liquid crystal molecules oriented in a direction parallel with the direction in which said stretching effect is produced.

9. A liquid crystal display device according to claim 1, wherein a light-intercepting part is provided in the central part of each of multiply divided orientation areas.

10. A liquid crystal display device comprising:
two electrode-attached substrates formed by causing electrode layers and polarizing elements severally containing multiply divided polarization areas to be superposed on said substrates and to be disposed so as to oppose said electrode layers to each other across a gap, and a liquid crystal composition placed in said gap and consequently interposed between said two electrode-attached substrates, and each of said polarizing areas severally having the directions of axes of easy light transmission or the directions of axes of light absorption set either in a radial pattern or in the shape of concentric rings.

11. A liquid crystal display device according to claim 10, wherein said polarizing elements are disposed one each on the outer sides of said two electrode-attached substrate having said liquid crystal composition interposed therebetween.

12. A liquid crystal display device according to claim 10, wherein said polarizing elements are disposed on said liquid crystal composition sides of said two electrode-attached substrates having said liquid crystal composition interposed therebetween.

13. A liquid crystal display device according to claim 10, wherein one of said polarizing elements is in the shape of concentric rings and the other polarizing element is in the radial pattern and the central part of said concentric rings or said radial pattern coincide vertically with the central part of said multiply divided polarizing areas.

14. A liquid crystal display device according to claim 13, wherein said multiply divided polarizing areas comprise not more than eight pixels apiece.

15. A liquid crystal display device according to claim 14, wherein said multiply divided polarizing areas comprise one pixel apiece.

16. A liquid crystal display device according to claim 10, wherein said liquid crystal composition is a polymer dispersion type liquid crystal.

17. A liquid crystal display device according to claim 10, wherein said multiply divided polarizing elements are formed by causing a dichroic dye to be adsorbed on the surface of an orientation film formed on an electrode.

* * * * *